Sept. 15, 1964  K. C. WOOLLEY ETAL  3,148,647
TUBE-FORMING MACHINE
Filed Jan. 25, 1962  3 Sheets-Sheet 1
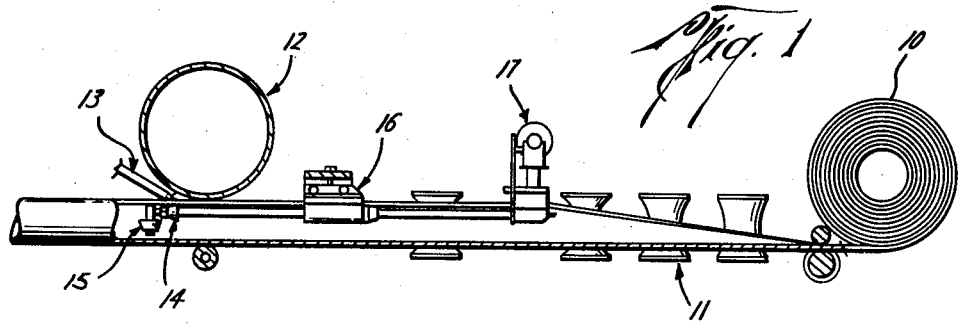
Fig. 1
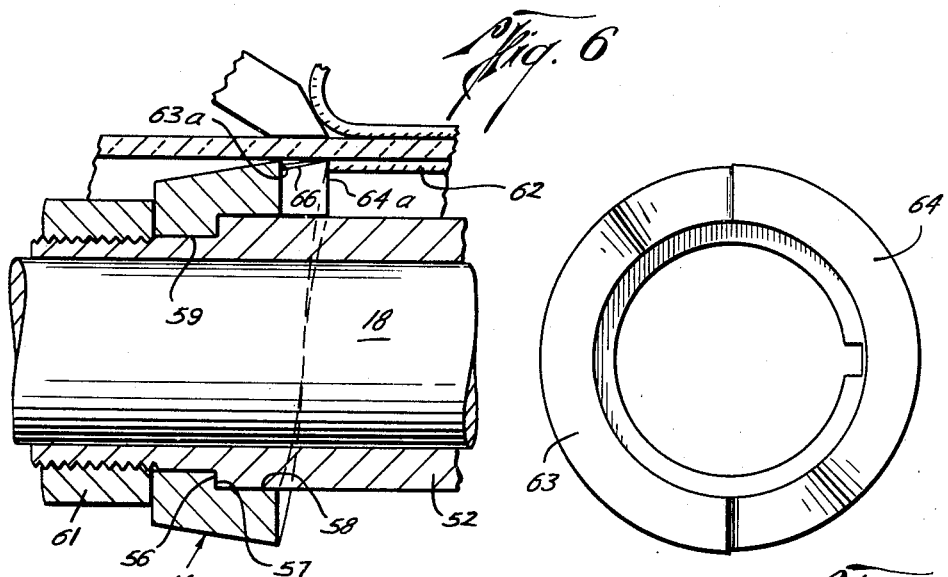
Fig. 6
Fig. 7
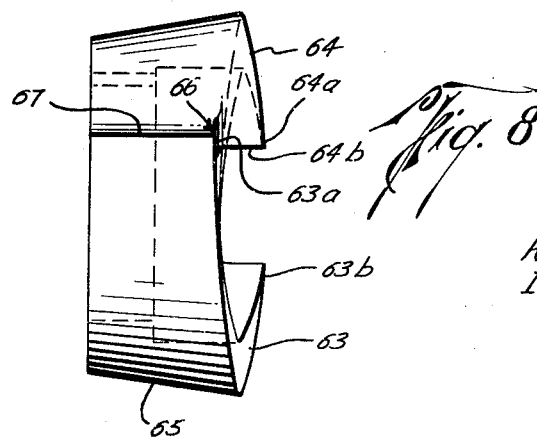
Fig. 8
Kenneth C. Woolley
Irvin W. Shaw
INVENTORS
BY
ATTORNEYS

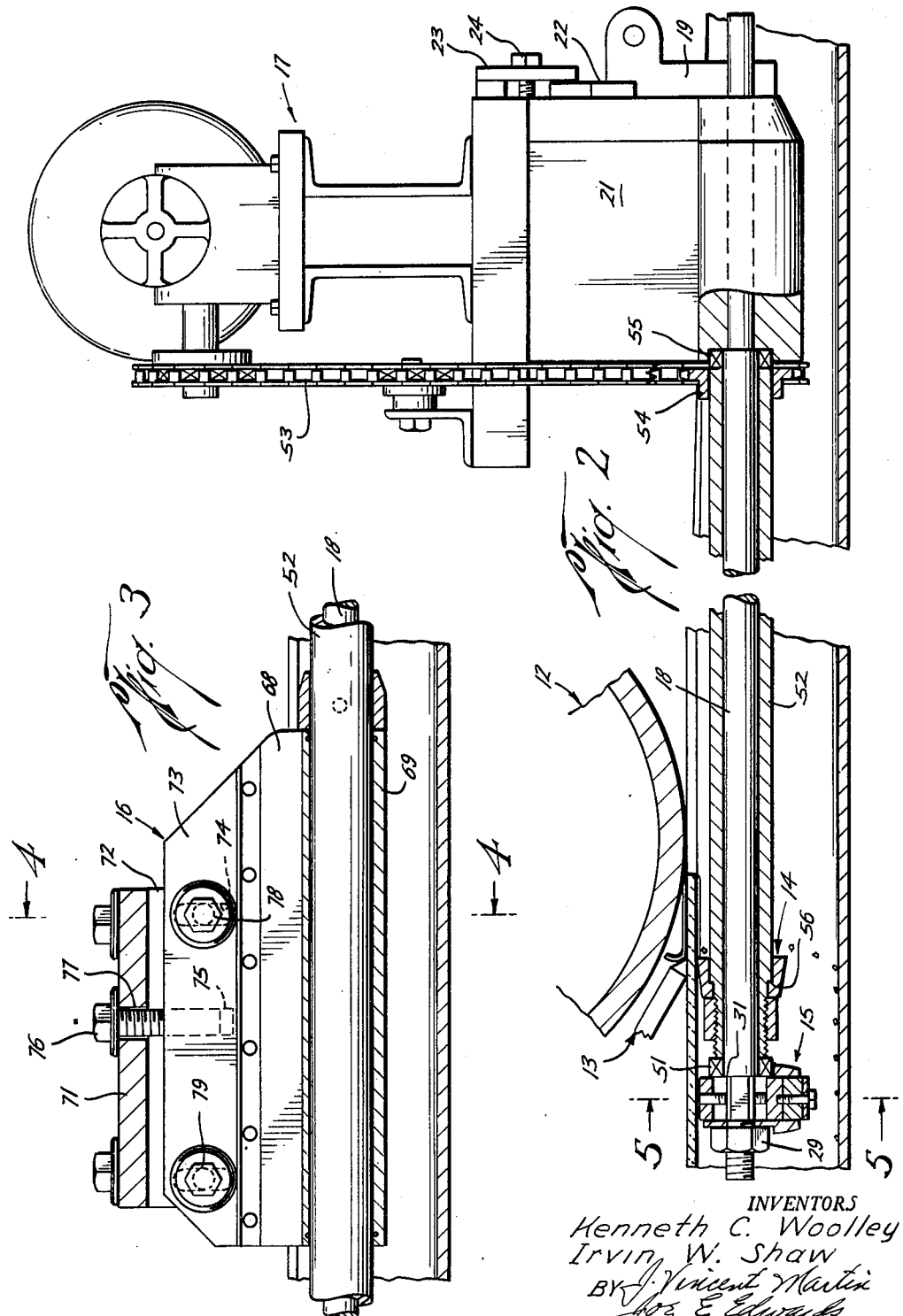

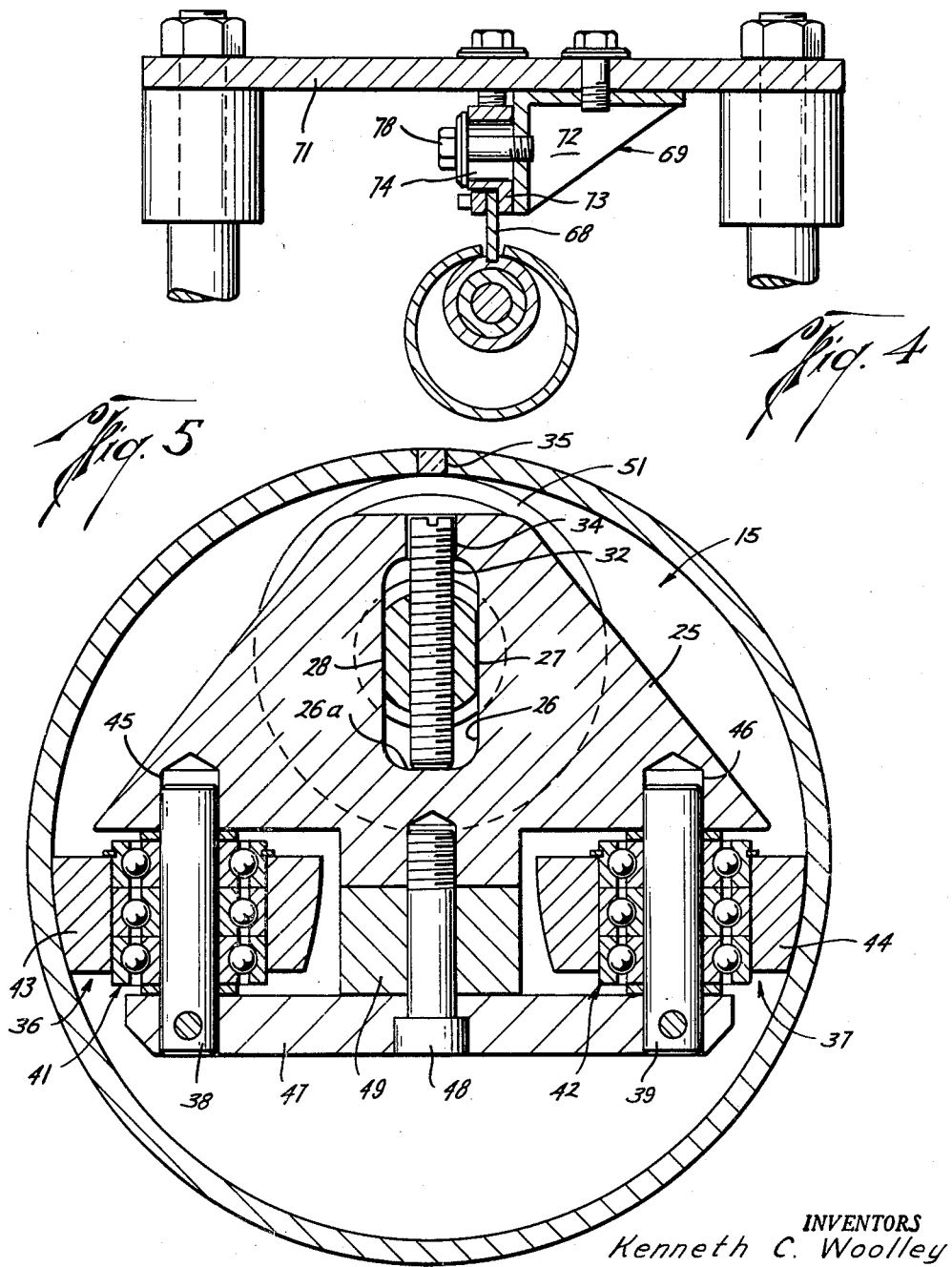

United States Patent Office 3,148,647
Patented Sept. 15, 1964

3,148,647
TUBE-FORMING MACHINE
Kenneth C. Woolley and Irvin W. Shaw, Houston, Tex., assignors to Tex-Tube, Inc., Houston, Tex., a corporation of Texas
Filed Jan. 25, 1962, Ser. No. 168,641
4 Claims. (Cl. 113—33)

This device relates to machines for forming welded seam tubing from a flat ribbon of metal, and more particularly to an improved device for removing the interior flash from the tubing, and is an improvement of the machine shown in our copending application Serial No. 759,200, now Patent No. 3,070,053.

In the flash removing machine shown in our copending application Serial No. 759,200 it was found that the forces set up during use of the device tended to induce a lateral or off-center shift so that difficulty was experienced in exactly centering the cutter below the weld in the pipe. We have discovered that if the cutter be held exactly below the weld, that the size of the cutter can be reduced, which gives greater room for passage of chips and flash can be removed to closer tolerance.

The flash removing portion of the machine illustrated in our above identified copending application tended to collect weld splatter which it was necessary to periodically remove.

An object of this invention is to provide a pipe mill with a machine for removing interior flash in which the cutter is held firmly in the desired cutting position and the possibility of an off-center shift of the cutter is substantially eliminated.

Another object is to provide a pipe mill with a machine for removing internal flash in which support rollers are positioned very close to the cutter for removing the flash to reduce as much as possible the fulcrum action of the cutter shift about support rollers.

Another object is to provide a pipe mill with an internal flash removing machine in which weld splatter does not accumulate on the flash removing machine.

Another object is to provide a new form of rotary cutter element which has a very small wall thickness.

Other objects, features and advantages of the invention will be apparent from the specification, the drawings and the claims.

In the drawings, wherein like reference numerals indicate like parts and wherein an illustrative embodiment of this invention is shown;

FIGURE 1 is a schematic view partly in elevation and partly in vertical cross-section through a pipe mill constructed in accordance with this invention;

FIGURE 2 is a fragmentary view on an enlarged scale partly in elevation and partly in vertical cross-section through the pipe mill of FIGURE 1;

FIGURE 3 is a view in vertical cross-section through a further fragment of the pipe mill of FIGURE 1;

FIGURE 4 is a view along the lines 4—4 of FIGURE 3;

FIGURE 5 is a view along the lines 5—5 of FIGURE 2;

FIGURE 6 is a fragmentary view in vertical cross-section through the rotary cutter of the machine;

FIGURE 7 is a view in elevation of the front cutting face of the rotary cutter; and, FIGURE 8 is a view in side elevation of the rotary cutter.

The pipe mill shown in FIGURE 1 feeds a ribbon of metal from a roll 10 through a plurality of shaping rolls indicated generally at 11, which shape the flat ribbon of metal into circular pipe form. The shaped ribbon is passed beneath the welding machine indicated generally at 12 which completes the formation of the pipe. Flash from the weld is left on both the interior and exterior of the pipe. This metal is immediately removed while still hot on the exterior by the scarifying tool indicated generally at 13. The interior flash is removed by the rotary cutter indicated generally at 14 also while the flash is still hot. The rotary cutter is supported by a fulcrum support assembly indicated generally at 15 which both provides a fulcrum support for the rotary cutter and prevents off-center shift of the cutter to maintain it immediately below the flash.

Positioning of the cutter 14 at the proper elevation is provided for by an adjustable assembly indicated generally at 16. The drive assembly indicated generally at 17 provides for rotation of the cutter.

The device includes a support shaft 18 which extends longitudinally along the interior of the tube being formed. This shaft is held against lengthwise movement by an arm 19 fixed to the end of the shaft adjacent the drive means 17. This arm 19 bears against the support 21 for the drive means. A flat plate 22 extending transversely to the axis of shaft 18 is carried by the arm 19 and also bears against the support 21. A flange-like latch 23 overlies the plate 22 and is secured to the support 21 by stud 24. When the arm 19 is rotated to the desired position, the stud 24 is run into the support 21 and holds the latch flange 23 firmly against plate 22 to hold the shaft 18 against rotation.

The roller support assembly 15 is secured to the other end of the support 18. This assembly provides a fulcrum point and prevents off-center shift of the cutter 14. The support assembly includes a body 25 having a vertically extending slot 26 therethrough which receives the shaft 18. As best shown in FIGURES 2 and 5, the shaft 18 at this point is provided with flats 27 and 28 which register with the side walls of slot 26 to prevent relative rotation between the body 25 and shaft 18. As shown in FIGURE 2, the end of shaft 18 is threaded and a suitable nut 29 secures the body against a shoulder 31 on support shaft 18 to hold the support on the shaft.

To provide for maximum flexibility in adjustment of the shaft and body, the slot is much longer than the corresponding dimension of the shaft, as best shown in FIGURE 5. An adjusting stud 32 extends through a hole 34 in the body and is threadedly received through the support shaft 18. The stud 32 bears on the bottom 26a of slot 26 and adjustably determines the height of the support shaft at its free end relative to the roller support.

At least a pair of rollers are mounted on said roller support body and engage opposite sides of the interior wall of the tubing being formed. The rollers are arranged to engage the tubing immediately below the diametral plane of the tubing which is 90° away from the weld 35. Stated otherwise, this diametral plane is perpendicular to the diametral plane of the tubing which passes through the weld 35. In the tube-forming machine illustrated, wherein the weld is formed at the top of the tubing, the diametral plane 90° away from the weld will of course be the horizontal diametral plane of the tubing. By engaging the tubing at these two spaced points, the rollers indicated generally at 36 and 37 perform the dual function of limiting downward movement of the roller support body 25 to thus provide a fulcrum for the support shaft 18. As they are engaging the side walls of the tubing at points which are substantially equal to the diameter of the tubing, they substantially eliminate any tendency of the support to shift in a direction along said diametral plane, and thus hold the rotary cutter 14 immediately below the weld 35. As the cutter is very close to the rollers 36 and 37, it cannot shift from under the flash of weld 35, and, being held in this centered position, the size of the roller can be reduced. A further advantage to running the rollers 36 and 37 on the side walls as distinguished from the bottom of the tubing is the provision of a substantial space, as best shown in FIGURE 5, for passage of chips beneath the roller support.

The rollers 36 and 37 may take any desired form. Preferably they are mounted for rotation about vertical axes provided by the pins 38 and 39, respectively, with suitable anti-friction ball assemblies indicated generally at 41 and 42 between the rollers proper and their support shafts. Preferably, each of the rollers proper 43 and 44 has an outer peripheral surface for engaging the tubing which is contoured to conform to the shape of the tubing at the point of engagement. For ease of assembly the pins 38 and 39 are received in downwardly opening holes 45 and 46, respectively, in the support body 25. The lower ends of pins 38 and 39 are carried by a bearing cap 47 which is secured to the support 25 by a suitable stud 48 which extends through a spacer block 49 into the roller support 25. A thrust bearing 51 is positioned about the shaft 18 and abuts against the roller support body 25.

A tubular shaft 52 is received over the shaft 18, that is, is concentric therewith, and is mounted for rotation on the shaft 18. This shaft bears against the thrust bearing 51.

The shaft is driven by the drive means 17 through a chain 53 and sprocket 54. The sprocket 54 is nonrotatably mounted on the end of tubular shaft 52 remote from bearing 51. In order to hold the tubular shaft 52 in proper position on the support rod 18, the tubular shaft extends to a point just short of the support 21 through which the shaft 18 passes, and a bearing 55 is provided between the support 21 and the tubular shaft 52.

The rotary cutter 14 is mounted on the end of tubular shaft 52 adjacent the roller support 15. Preferably, the rotary cutter is mounted as close to the roller support as possible. In the illustrated embodiment, the tubular shaft is provided with a shoulder 56 and the interior of the cutter 14 is provided with a mating shoulder 57 between a bore 58 and a counterbore 59. These shoulders are held in abutment by nut 61 received on the threaded end of the tubular shaft 52.

The rotary cutter 14 is provided with means for removing and breaking the inner flash 62 into small chips. To accomplish this function the cutter has a discontinuous endwise facing cutting surface provided by a plurality of helical endwise facing surfaces 63 and 64 arranged stepwise about the rotary cutter. The cutter has a frustoconical outer periphery 65 and the cutting surfaces 63 and 64 have a substantially constant maximum radius. This means that the end 63a of cutting surface 63, even though spaced axially toward the smaller diameter section of the frusto-conical outer periphery, will have substantially the same radius as the beginning 64a of the adjacent cutting surface. This results in a shallow groove 66 behind the beginning of cutting surface 64a. It is preferred that the maximum radius of the outer periphery of each cutting surface at the end thereof, that is for instance surface 63a, be slightly less in maximum radius than the beginning of surface 63, that is, at point 63b.

It is further preferred that the cutting surfaces overlie each other slightly as indicated generally at 66.

With the above construction it will be appreciated that a sharp scarifying edge at the junction of the outer periphery of the rotary cutter and the cutting surface is provided. This sharp edge will permit removal of flash down to close tolerance. While the cutter may be rotated in either direction and remove flash and break it into chips, it is preferred to rotate the cutter counter-clockwise when viewed from the drive sprocket 54. As the tubing is moving to the left, a chip of flash will be severed from the tubing and the shoulder 64b between cutting surface 63 and cutting surface 64 will break this flash free from the tubing. The overlap of cutting surfaces 63 and 63a will insure that any roughness at the point of breaking the chip from the tubing is wiped clean by this sharp cutting edge 63a. At this time, the cutting surface 64 beginning at 64a begins to remove another chip. It will be noted that the outer periphery 65 is not uniformly circular due to the radially outermost dimension of the front edge of the cutter being substantially constant though formed on a helix. Thus, from the point 63a to the small diametral end of the cutter the conical angle is constant. As the conical angle of the outer periphery of the cutter beginning at the point 64a and just clockwise of the overlap 63a is also a constant angle, it will be apparent that there is a slight step-down in the outer periphery of the cutter along the line 67. This arrangement gives the added function of the outer periphery of the rotary cutter at the point 63a bearing against the tubing when the point 64a on the next cutting surface begins digging into the flash. The point 63a thus prevents the point 64a of the next cutting surface from digging into the wall of the tubing as best illustrated in FIGURE 6.

Movement of the cutter support shaft about the fulcrum rollers 43 and 44 is controlled by the positioning means 16. This means includes a blade-like member 68 which extends through the gap in the tubing and has secured thereto a journal 69 in which the tubular shaft 52 rotates. The blade-like member 68 is held on an adjusting means indicated generally at 69 which is supported on a cross-bar 71 suitably mounted on the machine. The adjusting means includes an angle member 72 secured to the bar 71. The blade 68 is carried by an adjusting member 73. This member has a plurality of vertically extending slots 74 therethrough and a threaded hole 75 in its upper surface. A stud 76 extends through a hole 77 in plate 71 and is threadedly received in the threaded hole 75. By running the stud 76 into and out of the threaded hole 75, the two shafts 18 and 52 are rocked about the fulcrum roller support 15. When the shafts are properly positioned, studs 78 and 79 are run up tight to lock the member 73 against the angle member 72 and hold the two shafts 18 and 52 in the desired position. It will be appreciated that this adjustment may be held to a minimum amount due to the adjustment provided by the stud 34 in the roller support, and therefore there will be very little tendency to rock the two shafts relative to support 21. In practice the shafts 18 and 52 are sufficiently long that any slight rocking which results can be tolerated.

It will be appreciated that the system illustrated will permit the shafts 18 and 52 to bend longitudinally or rock about the fulcrum roller assembly 15 when a slightly out-of-round condition is encountered and the rotary cutter tries to cut into the wall of the tubing on either side of the flash. With this give, which need only be a small amount due to the rotary cutter being very close to the roller support, gouging of the tubing is prevented while maintaining the diameter of the rotary cutter at a minimum figure. It will be appreciated that the diameter of the cutter must remain large enough to give a substantial bearing engagement with the wall of the tubing on either side of the flash to be removed, but with the cutter placed very close to the fulcrum support and the fulcrum support constructed to prevent side shifts, the rotary cutter can be smaller than heretofore possible.

The particular construction of the rotary cutter permits the use of a cutter having a relatively small radial wall thickness as it eliminates the lands and grooves in the outer periphery of the cutter as used in the past.

The fulcrum rollers are disclosed to engage the tubing below a horizontal diametral plane of a cylinder defined by the rollers and the point on the cutter remote from the rollers. This cylinder is of course the I.D. of the pipe being formed. It is apparent that they could extend above this plane but their fulcrum support would have to function at a point below this plane, and therefore the illustrated arrangement is preferred. It is of course within the scope of the claims to have the rollers additionally engage above the horizontal diametral plane of the tubing to assist in preventing off-center shift if desired. Rollers could be utilized which engage the tubing above the diametral plane in combination with another set of rollers which engage the tubing below the diametral plane to accomplish the double objective of rollers 43 and 44.

The foregoing disclosure and description of the invention is illustrative and explanatory thereof and various changes in the size, shape and materials, as well as in the details of the illustrated construction, may be made within the scope of the appended claims without departing from the spirit of the invention.

What we claim is:

1. In a tube-forming machine having a plurality of rollers for shaping a continuous strip of metal into tubular form and a welder for welding the seam in the tube, a support shaft extending longitudinally along the interior of the tube being formed, a roller support secured to one end of said shaft, a pair of rollers mounted on said support for engaging opposite sides of the interior wall of the tubing being formed, a tubular shaft concentric with and rotatably mounted on said support shaft, means for rotating said tubular shaft, a rotary cutter mounted on said tubular shaft closely adjacent said roller support and having means for removing flash from the interior of the tube and breaking the flash into chips, and means between the cutter and shaft rotating means engaging said tubular shaft and positioning the periphery of the rotary cutter for rotation in an arc which passes through the flash on the inside of the tube being formed, said rollers and cutter positioned to define a cylinder with at least a portion of each roller located immediately adjacent a diametral plane of the cylinder which is 90° away from the point on the cutter which defines the cylinder and on the opposite side of the plane from the cutter.

2. The tube-forming machine of claim 1 wherein said rollers are mounted for rotation about axes normal to said plane and have exterior tubing engaging surfaces which conform to the curvature of the wall of the tubing.

3. The tube-forming machine of claim 1 wherein the rotary cutter has a discontinuous endwise facing cutting surface provided by a plurality of helical endwise facing surfaces arranged stepwise about the rotary cutter, said rotary cutter having a substantially frusto-conical exterior surface, and said helical cutting surfaces having substantially constant maximum radii and having their radially outer extremities overlapping slightly.

4. In a tube-forming machine having a plurality of rollers for shaping a continuous strip of metal into tubular form and a welder for welding the seam in the tube, support means extending longitudinally along the interior of the tube being formed, a roller support secured to one end of said support means, a pair of rollers mounted on said support means for engaging opposite sides of the interior wall of the tubing being formed, a shaft mounted on said support means, means for rotating said shaft, a rotary cutter mounted on said shaft closely adjacent said roller support and having means for removing flash from the interior of the tube and breaking the flash into chips, and means between the cutter and shaft rotating means engaging said shaft and positioning the periphery of the rotary cutter for rotation in an arc which passes through the flash on the inside of the tube being formed, said rollers and cutter positioned to define a cylinder with at least a portion of each roller located immediately adjacent a diametral plane of the cylinder which is 90° away from the point on the cutter which defines the cylinder and on the opposite side of the plane from the cutter.

References Cited in the file of this patent

UNITED STATES PATENTS

| | | |
|---|---|---|
| 2,054,311 | Adams | Sept. 15, 1936 |
| 2,654,292 | Pearson | Oct. 6, 1953 |
| 3,014,118 | Vassar | Dec. 19, 1961 |